(12) United States Patent
Takahashi

(10) Patent No.: US 7,654,212 B2
(45) Date of Patent: Feb. 2, 2010

(54) FRICTIONAL RESISTANCE REDUCTION SHIP

(76) Inventor: Yoshiaki Takahashi, 2-31-1-705 Sakurashinmachi, Setagaya-ku, Tokyo (JP) 154-0015

( * ) Notice: Subject to any disclaimer, the term of this patent is extended or adjusted under 35 U.S.C. 154(b) by 0 days.

(21) Appl. No.: 12/418,572

(22) Filed: Apr. 4, 2009

(65) Prior Publication Data

US 2009/0260561 A1 Oct. 22, 2009

(30) Foreign Application Priority Data

Apr. 17, 2008 (JP) .............................. 2008-107482
Apr. 22, 2008 (JP) .............................. 2008-110812

(51) Int. Cl.
*B63B 1/34* (2006.01)
*B63B 1/38* (2006.01)

(52) U.S. Cl. ..................................... 114/67 A

(58) Field of Classification Search ............... 114/67 R, 114/67 A, 288–290
See application file for complete search history.

(56) References Cited

U.S. PATENT DOCUMENTS

| | | | | |
|---|---|---|---|---|
| 1,398,246 A | * | 11/1921 | Trask | 114/67 A |
| 3,628,488 A | * | 12/1971 | Gibson | 114/67 A |
| 3,690,283 A | * | 9/1972 | Pool et al. | 114/67 A |
| 6,145,459 A | * | 11/2000 | Takahashi et al. | 114/67 A |
| 6,789,491 B2 | * | 9/2004 | Takahashi et al. | 114/67 A |

FOREIGN PATENT DOCUMENTS

| | | |
|---|---|---|
| JP | S60-181306 D | 6/1987 |
| JP | S60-196077 D | 6/1987 |
| JP | 2000-142555 A1 | 5/2000 |
| JP | 4070385 B1 | 1/2008 |

* cited by examiner

*Primary Examiner*—Ajay Vasudeva
(74) *Attorney, Agent, or Firm*—Lee Fredric Sharra

(57) ABSTRACT

The friction drag decreases and the friction resistance decrease ship that improves fuel cost is offered.

Duct 3 is divided into two or more independent chambers 5, with partition 4 according to the longitudinal direction; piping 6 is introduced in each chamber 5 and penetrates through partition 4 to supply air to each chamber 5. Air is supplied by assistance compressor 7 through piping 6. Opening 8 is formed in the lateral aspect of each chamber 5, and microbubble generator 10 is installed in this opening 8.

4 Claims, 4 Drawing Sheets

(a)

(b)

FRICTIONAL RESISTANCE REDUCTION SHIP

FIELD OF THE INVENTION

This invention relates to a frictional resistance reduction ship that supplies fine bubbles (microbubbles) to the outside surface the hull, thereby reducing the frictional resistance between hull and water, and its operation method.

BACKGROUND TECHNOLOGY

It is known that the hull friction resistances in water will become smaller by supplying air bubbles to the surface of a moving hull.

A pipe is attached along lateral aspects of the hull as a means to send air to the bubble generator prepared in the ship's bottom (lateral surface), and a means to supply air with this pipe is described in JP 11-180380 A (Prior art 1) and JP 2000-296796 A (Prior art 2).

In order to reduce frictional resistances effectively, it is desirable that bubbles stop at the hulls surfaces for a long time, and, for that purpose, it is required that bubble diameter should be small as possible. Such microbubbles are generated according to the Kelvin-Helmholtz Instability Phenomenon as described in JP 2002-2582 A (Prior art 3).

Prior art 3 describes that, preparing a recess in the shell (immersion surface) of a ship's bottom, and connecting a gas tube which supplies air to this recess, negative pressure portion having a wedge shape is attached to the upper stream side of a recess, and generates the Kelvin-Helmholtz-instability phenomenon to make microbubbles in a recess.

Moreover, in JP 4070385 A (Prior art 4), the technology of employing a wing is disclosed as a means which make microbubbles instead of the wedge-shaped negative pressure formation part disclosed to the patented documents 3.

[Prior Art 1] JP11-180380 A
[Prior Art 2] JP2000-296796 A
[Prior Art 3] JP2002-2582 A
[Prior Art 4] JP4070385

DISCLOSURE OF THE INVENTION

Object of the Invention

According to the technology indicated by Prior art 3 and 4, preferable microbubbles can be made for the reduction of frictional resistance. However, in these prior art references, it is necessary to form a opening in a hull for attaching a chamber, this chamber is a negative pressure portion. And work is difficult, since a ship hull consists of thick steel.

It is then possible to apply the microbubble generator indicated by the prior art 3 and 4 at the tip of the pipe of the prior art 1 or as a gas jet part of the prior art 2. However, it is not indicated by the prior art 1 and 2 that each prepares one gas jet part in one pipe. Therefore, a microbubble generator cannot be installed in either the skin of the hull nor the lateral surface of the hull.

Means of Solving the Problems

In order to solve above-mentioned problems, a frictional resistance reduction ship concerning the invention prepares air ducts for air supply along a ship's bottom from the lateral surface of a hull. The air ducts are divided into multiple chambers which are independent along longitudinal directions. Piping for supplying air for every chamber is introduced, and the microbubble generator is attached to the opening formed in said chambers. Here, fine bubbles refer to the air bubbles of particle diameter which is several millimeters or less, and preferably 1 mm or less.

The structure of said microbubble generator is not limited. For example, it consists of a plate inserted in the opening formed in said duct, and a wing for negative pressure generation attached to the plate, the part of the plate which counters said wing, and it is considered as the structure, the window place which forms an air-liquid unstable interface, when disturbance arises with the negative pressure generated by the above mentioned wing.

As a structure of above mentioned plate, it is considered that to make a groove which connects the window and the inside of a duct, the groove is formed into the portion which becomes the upstream on the basis of the direction of movement of a ship. When the bolt hole for the installation is formed in the plate, the groove is formed in the position which avoids the bolt holes.

Moreover, as an operating method of the frictional resistance reduction ship, in order to depress air-liquid interface where the microbubble generation region is significantly below the water line, an assist compressor is continuously used during a cruising.

When a ship begins to move, the air-liquid interface moves down along with the navigation of the ship. Not a great amount of pressure is needed to push down the column of water from the interface to the upper part of the microbubble generator and supply air to microbubble generator. A large capacity compressor is not required, for example, when main engine output is a ship of 10,000 kw, it is sufficient for a 10-20 kw capacity compressor to be used.

Effects of Invention

Since it is not necessary to make a hole in a hull according to the frictional resistance reduction ship concerning invention, installation work is completed within a short time. Moreover, since air flows independently into the chamber which divided the air duct, the lower stream side of an air duct does not run short of air. That is, since hull surface and side can be covered by a microbubble, friction resistances are reduced moreover and fuel efficiency improves.

Moreover, the plate having a window which forms an air-liquid unstable interface is a structure of microbubble generator, if the groove which connects said window and the inside of an air duct is formed in said plate. Because the plate can be attached to the air duct in the position where the plate touches a hull, the size of the air duct (microbubble generator) jutting out over a hull's exterior can be minimized, and moreover resistance can be reduced.

BRIEF DESCRIPTION OF THE DRAWINGS

Preferred embodiments of the present invention are explained referring to the attached drawings.

FIG. 6 (b) depicts the details of the mechanism of minute bubble (microbubble) development, the same as FIG. 5 (c).

DETAILED DESCRIPTION OF THE PREFERRED EMBODIMENTS

Figure 1:
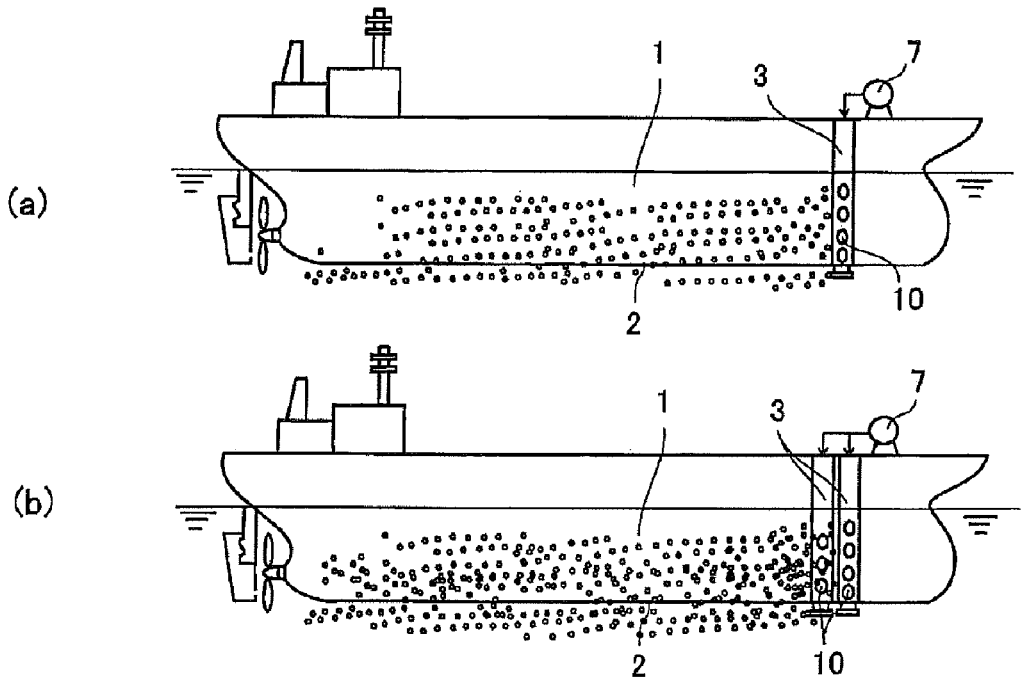
FIGS. 1(a) and (b) show the side view of the frictional resistance reduction ship of the present invention.

The frictional resistance reduction ship of the present invention is equipped with a duct 3 for air supply in the up-and-down direction along a bottom 2 from the lateral surface 1 of the hull. The end of the horizontal direction of the air duct 3 is made into taper-like portion, so as to lessen the resistance at the time of a cruising. This taper-like portion may employ separate member.

In this embodiment, the cross-sectional shape of the ducts 3 is not rectangle-like, but channel-like in shape. When the air duct is attached to a hull, the form of the air duct becomes nearly flat having little amount overhanging on outside (H). It is possible to attach a cross-sectional rectangle-like air duct to a hull. For example, in the case of the embodiment shown in FIG. 4, the amount of overhangs (H) is about 40 mm.

Although in the example shown in FIG. 1(a) the number of the ducts 3 is one, in example (b) two of said duct 3 are shown formed successively. Each duct 3 is divided into two or more chambers 5—which become independent in accordance with the length direction by the septum 4. Piping 6 (air charging line), for supplying air to each chamber 5 penetrates the septum 4 for supplying air to each chamber 5, and air in piping 6 is supplied from the assistant compressor 7.

An opening 8 is formed in the lateral aspects of each chamber 5, and the microbubble generator 10 is attached to this opening 8. In FIG. 1(b), an alternative arrangement of the microbubble generators 10 is depicted, and is trying for microbubble to cover the hull surfaces uniformly. Moreover, although two or more microbubble generating members 10 are attached to one chamber 5 in the embodiment, one microbubble generator 10 may be attach to one chamber 5.

The microbubble generator 10 consists of an ellipse-like plate 11 inserted in opening 8 formed in the lateral aspects of a chamber 5, and a dolphin shape wing 13 attached to the plate 11 through the connector 12. The rectangle-like window 14 is formed in the plate 11, the position of the window 14 is countered to the wing 13, and the shape of window 14 is almost same to external of the wing 13. The shape of the upper surface 13a of said wing 13 has a convex form toward to the window 14.

Moreover, wing 13 is attached parallel to the lateral surface 1 of the hull, so that the surface 13a may be almost perpendicular, and the gap g2 of the back edge of a wing 13 and plate 11 is larger than the gap g1 of front edge of a wing 13 and plate 11. When a vessel having such composition cruises, negative pressure occurs between the wing 13 and the window 14.

When the vessel starts navigation, as described above, the plural chambers 5, which are dividedly formed in air duct 3, and where chamber 5 is attached to the lateral surface 1 of a hull, the air-liquid interface in chamber 5 decreases with the negative pressure generated by the wing 13. In order to further lower the air-liquid interface level near window 14, the air-liquid interface 15 can be depressed by assist compressors 7.

When vessel cruising speed increases, the negative pressure generated by wing 13 will become larger, and as a result, the inside of a chamber increases positive pressure compared with an exterior (sea water) side, and the air-liquid interface 15 changes its vertical level situation state. FIG. 5(a) and (b) show this state.

In this part, when the air-liquid boundary side 15 is depressed near window 14, the air and liquid (seawater) move at different speeds. Since density differs between air and water, as shown in FIG. 5(a) and (b), in the inner space of the window 14 of the microbubble generator 10, microbubbles are generated according to the Kelvin-Helmholtz instability phenomenon, and these microbubbles flow through into the downstream side along the hull.

On the other hand, turning to the microbubble generator 10 attached to the air ducts 3 (chamber 5) of hull bottom 2, while they have been level unlike the microbubble generator 10 perpendicularly attached to the lateral surface 1 of a hull, the resulting microbubbles will be generated by disturbance at the air-liquid interface.

Figure 4:
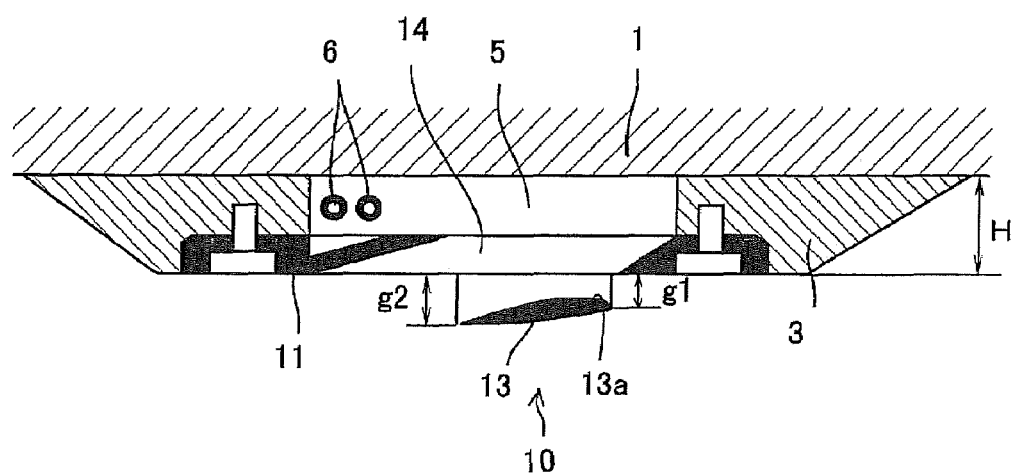
FIG. 4 illustrates the direction sectional view of B-B of FIG. 3.
Figure 5:
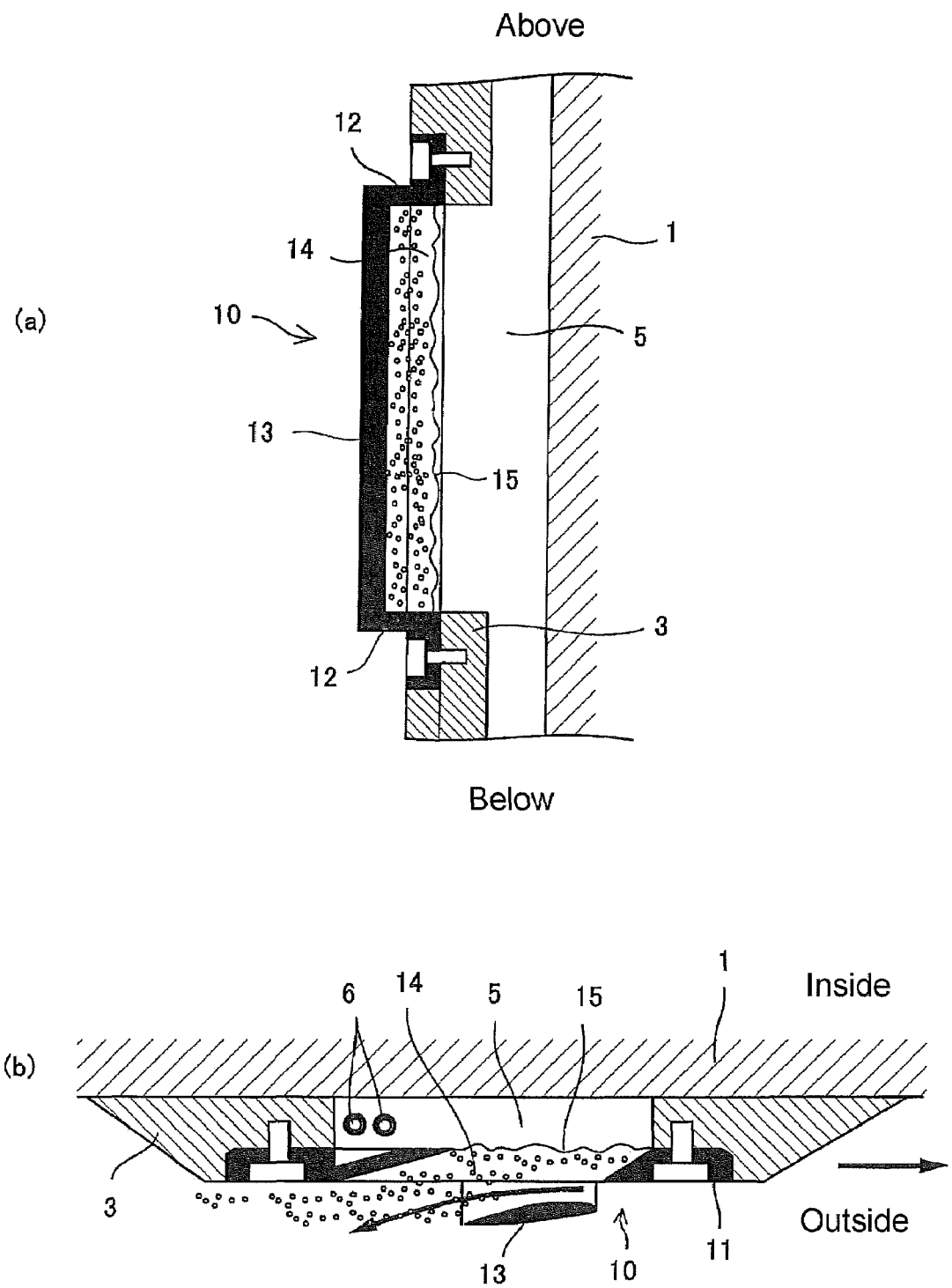
FIG. 5(a) shows a longitudinal section explaining the detailed mechanism of fine air-bubble (microbubble) generation and (b) shows a flat section explaining the detailed mechanism of air-bubble (microbubble) generation.
Figure 6:
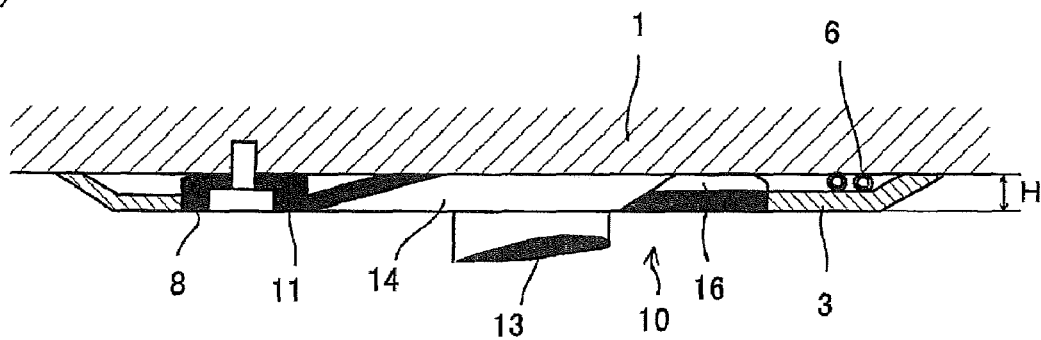
FIG. 6 Shows another embodiment of the microbubble generator 10, where FIG. 6 (a) is similar to FIG. 4.
Figure 6:
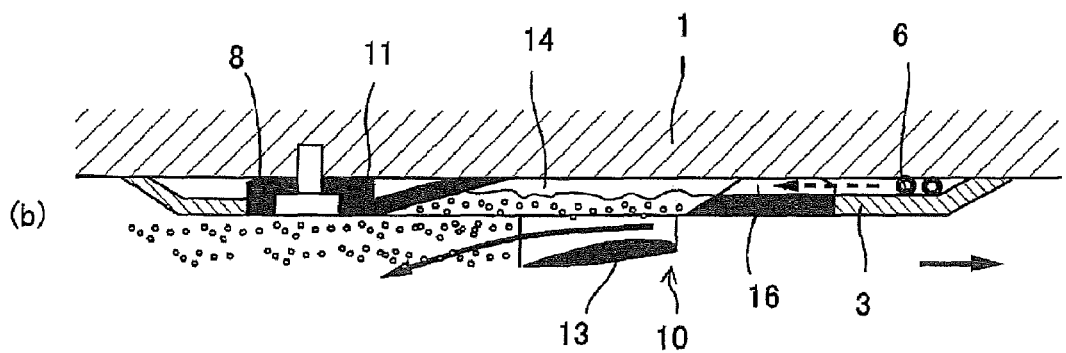

FIG. 6 shows another embodiment of the microbubble generator 10, where (a) is similar to FIG. 4; and (b) depicts the details of the mechanism of minute bubble (microbubble) development, the same as FIG. 5(c)

In this embodiment, the groove 16 which connects the window 14 and the inside of a chamber (air ducts) 5 into the portion which becomes the upstream of said plates 11 is formed on the basis of the direction of movement of the ship (in this figure towards the right side).

Within the limits of the area of a plate 11, since the groove 16 is formed so that it may not interfere with the attachment hole of a bolt, there is no change in the thickness of the plate 11 shown in the examples. And while the thickness of plate 11 does not change, air can be supplied in the window 14 through the slot 16 of thickness within the limits of a plate 11. Therefore, the amount of excrescence of a plate 11 is decided when the back side of a plate 11 is applied to a hull. In the case of this example, the amount of excrescence (H) can be about 20 mm, and it is about half thickness of the above example.

In the case of this example, as shown in FIG. 6(b), the Kelvin-Helmholtz instability phenomenon is generated in the medial portion in window 14, and a as a result the microbubbles are caused.

Although the example of illustration showed that equipped with the plate 11 and wing 13 as a microbubble generator 10, detailed microbubble generating components other than this are employable. For example, a porous ceramic structure with a cellular sequence or punching plate are attached to the opening 8 formed in the chamber 5, and the air-liquid interface will be depressed to the position of the porous ceramic structure or the punching plate by the assist compressors.

Simple Explanation of the Drawings

[FIG. 1](a) and (b) show the side view of the frictional resistance reduction ship of the present invention.

Figure 2:
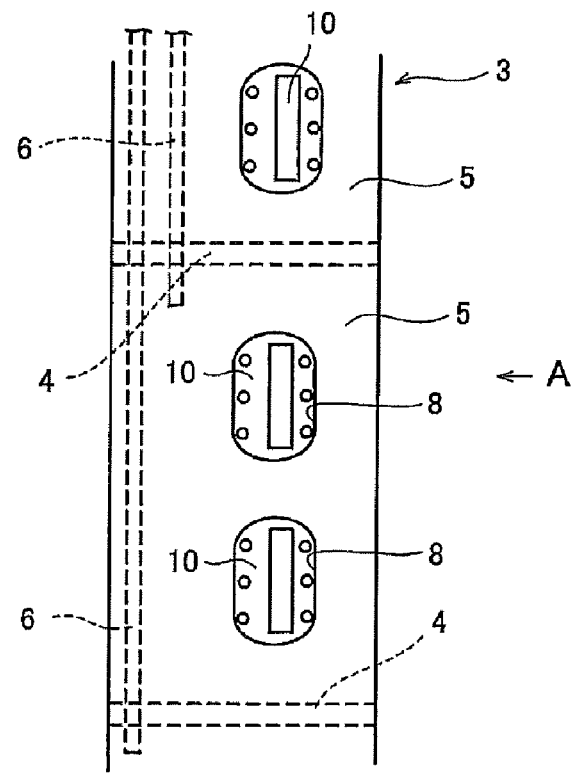
FIG. 2 shows a part of the duct which attached to the side of a frictional resistance reduction ship.

[FIG. 2] Shows a part of the duct which attaches to the side of a frictional resistance reduction ship.

Figure 3:
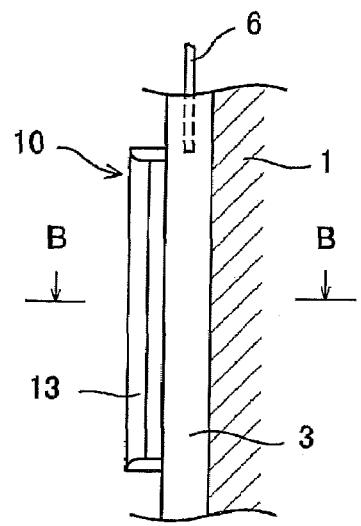
FIG. 3 shows a view of the direction A of FIG. 2.

[FIG. 3] Shows a view of the direction A of FIG. 2.

[FIG. 4] An illustrated the direction sectional view of B-B of FIG. 3. [FIG. 5](a) Shows a longitudinal section explaining the mechanism of detailed air-bubbles (microbubble) generation; and (b) Shows a flat section explaining the mechanism of detailed air-bubbles (microbubble) generation.

LIST OF NUMBERING OF PARTS

1 Lateral aspects of hulls; 2 bottom; 3 Air duct for air supply; 4 septum; chamber; 6 Piping; 7 assist compressors; 8 opening; 10 microbubble generator; 11 plate; 12 connect; 13 wing; 13a wing surface which opposes to the window; 14 window; 15 air-liquid interface; 16 groove; H amount projecting outside duct; g1 the gap of front edge of a wing and plate; g2 the gap of the back edge of a wing and plate.

What is claimed is:

1. A frictional resistance reduction ship, comprising:
    ducts arranged along lateral sides of a hull of said ship, said ducts configured for supplying air to an outside surface of said hull and extending substantially perpendicularly from near an upper end of said hull to a bottom end of said hull;
    each duct divided into chambers, said chambers being independent along a longitudinal direction of said duct;
    piping for supplying air to each one of said chambers;
    an opening formed in each one of said chambers;
    a microbubble generator attached to each said opening;
    said microbubble generator consisting of a plate inserted in said opening and a wing for negative pressure generation attached to the plate, a window formed in the plate at a location opposite the wing on said plate, said window allowing passage of the air to the outside surface.

2. The frictional resistance reduction ship according to claim 1, wherein a groove is formed at an upstream part of the plate, said groove extending between the window and the duct in the direction of movement of said ship.

3. A method of operating the frictional resistance reduction ship of claim 2, comprising:
    discharging air as microbubbles along said outside surface of said hull to reduce frictional resistance when the ship is cruising, wherein an air-liquid interface level in said duct decreases with the negative pressure generated by the wing when the ship is cruising, and wherein the air-liquid interface level can be further lowered toward said window or below a water line outside the hull by assist compressors.

4. A method of operating the frictional resistance reduction ship of claim 1, comprising:
    discharging air as microbubbles along said outside surface of said hull to reduce frictional resistance when the ship is cruising, wherein an air-liquid interface level in said duct decreases with the negative pressure generated by the wing when the ship is cruising, and wherein the air-liquid interface level can be further lowered toward said window or below a water line outside the hull by assist compressors.

* * * * *